United States Patent [19]

Braun et al.

[11] 3,855,576

[45] Dec. 17, 1974

[54] ASYNCHRONOUS INTERNALLY CLOCKED SEQUENTIAL DIGITAL WORD DETECTOR

[75] Inventors: William V. Braun, Lauderhill; Eugene J. Bruckert, Plantation; Gerald L. Giacomino, Coral Springs; Phillip Partipilo, Lauderdale Lakes, all of Fla.

[73] Assignee: Motorola, Inc., Chicago, Ill.

[22] Filed: May 29, 1973

[21] Appl. No.: 364,988

[52] U.S. Cl.... 340/146.2, 235/181, 340/146.3 WD, 340/146.3 Z

[51] Int. Cl........................... G06f 7/02, G06f 15/34

[58] Field of Search .. 235/181; 340/146.2, 146.3 Q, 340/146.3 WD, 146.3 Z, 149 R, 167 R

[56] References Cited

UNITED STATES PATENTS

| | | | |
|---|---|---|---|
| 3,467,946 | 9/1969 | Stefanik | 340/146.2 |
| 3,493,929 | 2/1970 | Webb | 340/146.2 |
| 3,529,291 | 9/1970 | Brown | 340/146.2 |
| 3,541,314 | 11/1970 | Webb | 340/146.2 |
| 3,573,742 | 4/1971 | Riddell | 340/146.2 |
| 3,576,534 | 4/1971 | Steinberger | 340/146.3 Q |
| 3,760,355 | 9/1973 | Bruckert | 340/146.2 |

*Primary Examiner*—Felix D. Gruber
*Attorney, Agent, or Firm*—Eugene A. Parsons; Vincent J. Rauner

[57] ABSTRACT

A detector for detecting predetermined digital words within a train of signals wherein the digits in the words each have a predetermined time period. The detector continuously samples the train of signals coupled thereto. Samplings are taken a number of times during the interval of a digit time period, and a digital signal corresponding to the sampled signal for each sample taken is stored in a multi-stage storage register. Comparison circuitry compares the digital signals in the storage register with a first predetermined word in a memory circuit. If there is a correlation, the comparison circuit counts for a time period long enough to sample the train of signals and store a new series of signals corresponding to a second digital word. The comparison circuit compares these second digital signals with a second word in the memory circuit. A correlation between theset two words produces a detection signal.

A signal correlator is also employed which samples the digital signals in the storage register and compares them to determine whether the signals constitute signal information or noise. If noise is detected, the correlator terminates the deteector and associated receiver operation for a predetermined period of time then re-energizes and again checks for the presence of signal information.

47 Claims, 5 Drawing Figures

ASYNCHRONOUS INTERNALLY CLOCKED SEQUENTIAL DIGITAL WORD DETECTOR

BACKGROUND

Asynchronous digital detectors, which require no bit or frame synchronization in order to detect and recognize a predetermined digital word have now been designed and can operate efficiently. Such a detector is disclosed in a patent application of William V. Braun and Eugene J. Bruckert, Ser. No. 340,153, filed Mar. 12, 1973, now U.S. Pat. No. 3,801,956 this application being a continuation of application Ser. No. 134,932, filed Apr. 19, 1971, and now abandoned; the continuation application being assigned to the same assignee as this application. In order to employ the asynchronous detector described in the above-noted application a particular type of digital word must be used. Because of the characteristics of the digital word, only a certain number are available. In the embodiment described in the above-noted application, a 23 bit binary word was employed. Using a 23 bit word, only 178 different words are available. This, of course, severely restricts the number of units in such a system which can be separately called. Because of this restriction, such a detector cannot be employed to full advantage in a large system such as a paging system. It is, however, possible to employ the basic technique used in the above-noted asynchronous detector.

In paging systems, it is preferable to employ two words sequentially in order to activate a desired pager. Sequential transmission systems previously employed tone signals rather than digital words. Furthermore, such systems would receive and detect the first tone signal, and generate a timing window. If the second tone signal was detected within the timing window, a detection signal was developed. Synchronization is not, however, necessary for detection of each tone in the sequence as is true in digital detectors.

Noise correlator detectors have also been employed in non-digital systems. These correlators sample the presence of an RF signal, tone signals, or audio on a period basis. If the proper signal is present, the remaining portions of the detector and associated receiver are maintained in an energized state. Digital systems also employ signal correlators, however, all such systems require bit or frame synchronization, so that the correlator is required to stay on for a predetermined period of time in order first to synchronize, and then to correlate the signal.

SUMMARY

It is an object of this invention to provide an asynchronous digital sequence detector.

Another object of this invention is to provide an asynchronous digital sequence detector requiring no system, preamble, or frame synchronization to detect the digital words.

A further object of this invention is to provide an asynchronous digital sequence detector, capable of use in a high capacity paging system and employing a large number of digital word, sequential combinations.

A still further object of this invention is to provide an asynchronous digital sequence detector wherein the digital words in the sequence are detected asynchronously, and the first word establishes a time period or window, during which the second word may be detected.

Yet another object of this invention is to provide an asynchronous digital sequence detector capable of recognizing and detecting a second digital word which is different in form from or has different digital characteristics than the first digital word in the sequence.

A yet further object of this invention is to provide a digital signal correlator which does not require system, bit or frame synchronization.

Still another object of this invention is to provide a digital signal correlator which can correlate the presence of signal immediately upon receipt thereof.

In practicing this invention, an asynchronous detector is provided for detecting predetermined binary words, sequentially received in a train of signals, wherein the bits in the binary words each have a predetermined time period. The detector includes a clock which continuously develops first clock pulses. A number of first clock pulses are developed within the interval of a bit time period. The train of signals is serially coupled to a first storage or shift register which operates in response to each first clock pulse to shift the contents of each stage to the next stage, and enter a binary signal into the first stage corresponding to the signal in the train of signals coupled to the input. A second storage register is provided for storing binary words corresponding to the binary words in the sequence to be recognized. A comparison circuit compares the binary signals in the first shift register with the first binary word in the sequence to be recognized which is stored in the second storage register. This comparison occurs between first clock pulses. If a predetermined number of correlations between the bits in the binary word and signals in the first shift register occur, the comparison circuit becomes operative to count a first time period at least as long as the time period of the bits in a binary word. At the end of the first time period, the comparison circuit generates a timing window, and then compares the binary signals presently in the first shift register with the second predetermined binary word in the sequence to be recognized which is stored in the second storage register. This comparison is taken between first clock pulses as was the first comparison, and the window exists for only a predetermined number of first clock pulses. If a predetermined number of correlations, between the signals in the first shift register and the bits of the second binary word in the second storage register, occurs between any first clock pulse, and during the presence of the timing window, a detection signal will be developed indicating that the correct sequence has been recognized.

A signal correlator is also provided which compares the binary signals within a group of stages of the first shift register. Miscorrelations between the binary signals compared in the group cause a counting signal to be developed. If a predetermined number of miscorrelations occur in response to a predetermined number of comparisons of successive groups of stages, and are counted between control signals generated subsequent to each first clock pulse, the signal correlator will activate a gate to inhibit the coupling of clock pulses from the clock, whereby the detector operation is terminated for a predetermined period of time. At the end of the predetermined period of time, the correlator is again energized to check for the presence of correlated signal. The signal correlator may also be employed to energize and de-energize certain portions of a receiver associated with the digital detector. In the preferred embodiment certain portions of a paging receiver are energized and de-energized.

THE DRAWINGS

DETAILED DESCRIPTION

Figure 1:
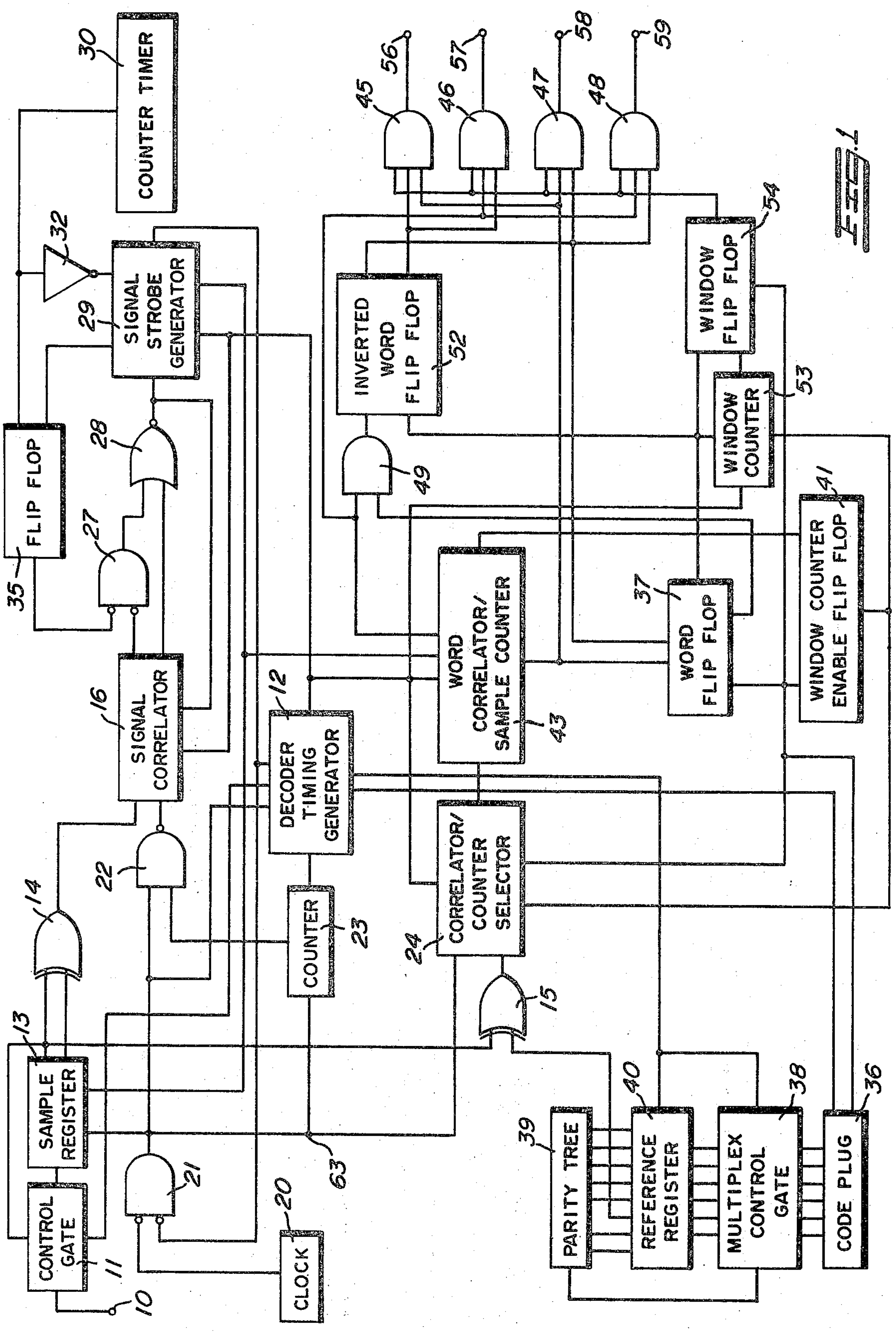
FIG. 1 is a block diagram of the asynchronous digital sequence detector embodying the features of this invention.

Referring to FIG. 1, input terminal 10 is connected to an input of control gate 11. Decoder timing generator 12 is coupled to a second input of control gate 11, and the output of control gate 11 is coupled to sample register 13. Sample register 13 has two outputs. One output is coupled back to control gate 11, to one input of Exclusive (EX) OR gate 14, and to one input of EX-OR gate 15. The second output of sample register 13 is coupled to the second input of EX-OR gate 14. The output of EX-OR gate 14 is coupled to one input of signal correlator 16.

A clock 20 which develops clock pulses, is coupled to one input of NOR gate 21. A second input of NOR gate 21 is coupled to signal strobe generator 29. The output of NOR gate 21 is coupled to one input of NAND gate 22, an input of decoder timing generator 12, another input of sample register 13, the input of counter 23, and a first input of correlator/counter selector 24. Counter circuit 23 has one output coupled to a second input of NAND gate 22, and a second output coupled to an input of decoder timing generator 12. The output of NAND gate 22 is coupled to a second input of signal correlator 16.

Signal correlator 16 has an output coupled to one input of NOR gate 27 and a second output coupled to one input of NOR gate 28. The output of NOR gate 27 is coupled to a second input of NOR gate 28. The output of NOR gate 28 is coupled back to another input of signal correlator 16, and to an input of signal strobe generator 29. Decoder timing generator 12 is coupled to an input of signal correlator 16 and signal strobe generator 29. The output of timer 30 is coupled to an input of flip-flop 35 and an input of inverter amplifier 32. The output of inverter amplifier 32 is coupled to another input of signal strobe generator 29. Decoder timing generator 12 has an input connected to the same output of signal strobe generator 29 as is connected to NOR gate 21. Another output of signal strobe generator 29 is connected to another input of sample register 13 and to word correlator/sample counter 43. Yet another output of signal strobe generator 29 is coupled to another input of flip-flop 35. The output of flip-flop 35 is connected to the second input of NOR gate 27.

Code plug 36 has an input connected to an output of decoder timing generator 12, and a second input connected to the output of word flip-flop 37. The outputs of code plug 36 are coupled to a number of inputs of multiplex control gate 38. Another input of multiplex control gate 38 is connected to an output of decoder timing generator 12, and still another input of multiplex control gate 38 is connected to the output of parity tree circuit, 39. The outputs of multiplex control gate 38 are connected to a number of inputs of reference register 40. The output of decoder timing generator 12 connected to an input of multiplex control gate 38 is also connected to an input of reference register 40. A number of outputs of reference register 40 are connected to the inputs of parity tree 39 while one output of reference register 40 is connected to the second input of EX-OR gate 15.

The output of EX-OR gate 15 is connected to a second input of correlator/counter selector 24. A third input of correlator/counter selector 24 is connected to an output of decoder timing generator 12. A fourth input of correlator/counter selector 24 is connected to an output of window enable flip-flop 41, and a fifth input is connected to an output of word flip-flop 37. The output of selector 24 is coupled to one input of word correlator/sample counter 43. A second input to counter 43 is connected to the output of decoder timing generator 12 coupled to signal correlator 16 and signal strobe generator 29. A first output of word correlator/sample counter 43 is coupled to an input of window counter enable flip-flop 41. A second output of word correlator/sample counter 43 is coupled to one input of word flip-flop 37 and to one input of AND gates 45, and 47. A third output of word correlator/sample counter 43 is coupled to one input of AND gate 49, and to an input of AND gates 46 and 48.

An output of word flip-flop 37 is coupled to a second input of AND gate 49. The second output of word flip-flop 37 is coupled to window counter enable flip-flop 41 and to window flip-flop 54, in addition to being coupled to selector 24 and code plug 36. The output of AND gate 49 is coupled to one input of inverted word flip-flop 52. The output of window counter enable flip-flop 41 coupled to correlator/counter selector 24 is also coupled to one input of window counter 53. Decoder timing generator 12 is coupled to a second input of window counter 53. One output of window counter 53 is coupled to a second input of inverted word flip-flop 52, to window flip-flop 54, and to word flip-flop 37. A second output of window counter 53 is coupled to a second input of window flip-flop 54. An output of inverted word flip-flop 52 is connected to an input of AND gates 47 and 48 and the second input of word flip-flop 37. A second output of inverted word flip-flop 52 is coupled to an input of AND gate 45 and 46. The output of window flip-flop 54 is coupled to an input of AND gates 45, 46, 47 and 48. An additional input to AND gate 46 is connected to input terminal 50. The outputs of AND gates 45, 46, 47 and 48 indicated at 56, 57, 58 and 59, respectively, develop the desired detection signals.

In the above and following descriptions, specific types of logic circuits are identified, as for example, OR, NOR, AND and NAND circuits. It is to be understood that this invention is not limited to the specific circuitry identified herein but may be any circuitry which performs the desired function. Furthermore, two symbols for NOR gates and two symbols for NAND gates are shown in the drawings. These two symbols are shown to more clearly depict the nature of the NAND or NOR function in each particular case.

Figure 2:
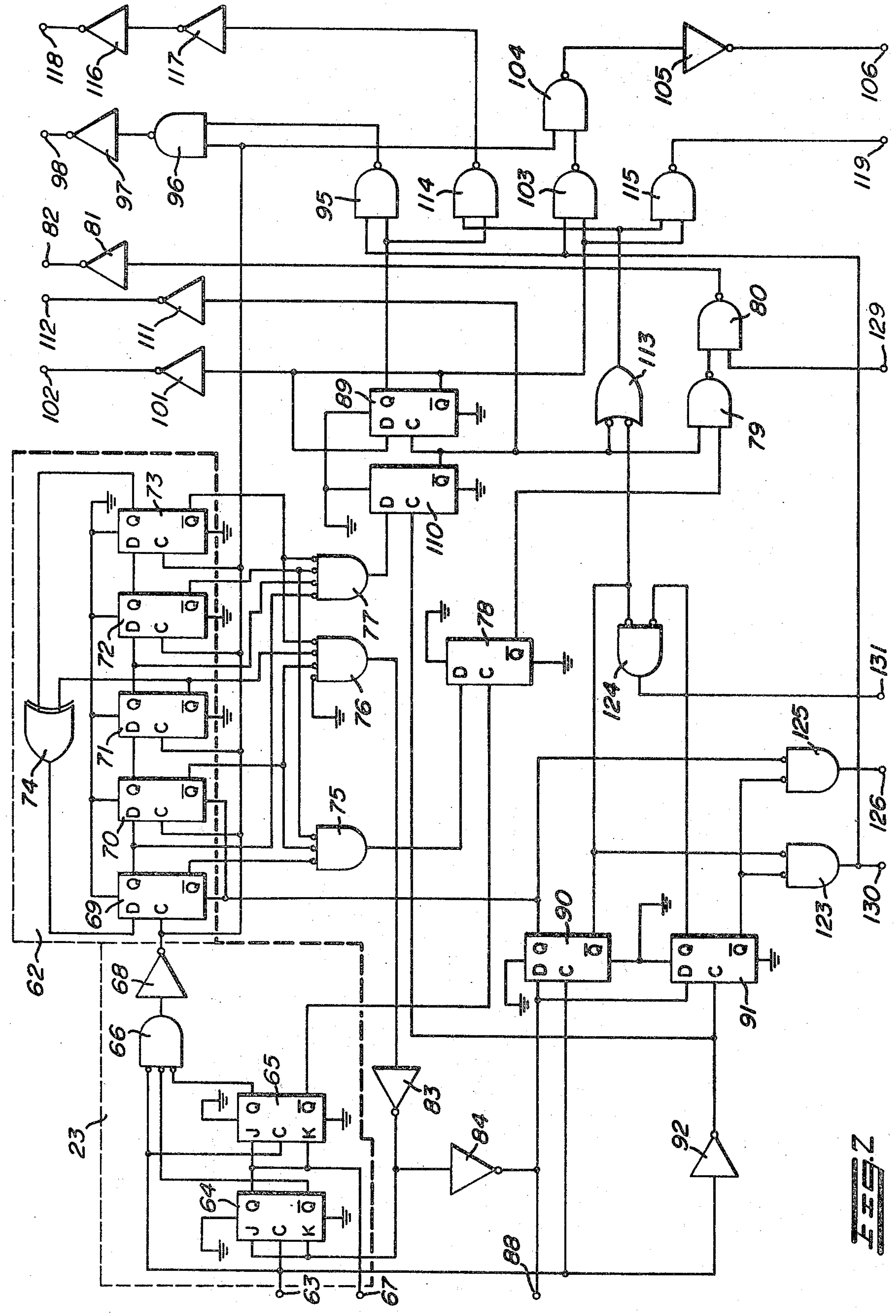
FIG. 2 is a block diagram showing in greater detail the counter circuit and the decoder timing generator in FIG. 1.

Referring to FIG. 2, counter circuit 23 and decoder timing generator 12 are shown in greater detail. Input terminal 63 is coupled to the output of NOR gate 21 in FIG. 1. Terminal 63 is coupled to an input of flip-flop 64, an input of flip-flop 65, and an input of NOR gate 66. Flip-flop 64 and 65, NOR gate 66 and inverter 68 are all part of divider circuit 23. An output of flip-flop 64 is coupled to terminal 67 and to another pair of inputs of flip-flop 65. An output of flip-flop 64 and an output of flip-flop 65 are coupled to inputs of NOR gate 66. The output of NOR gate 66 is coupled to the inputs of inverter 68, and the output of inverter 68 is coupled to the first stage of a five stage counter 62. Counter 62 includes flip-flops 69, 70, 71, 72 and 73. All of the interconnections of these stages need not be described in detail as they are commonly known to those skilled in the art. The interconnection of stages 69 through 73 can provide a counter capable of counting or dividing the input signal by 32. If a lower count is desired, the flip-flops can be preprogrammed by correct wiring in order to provide the lower counting characteristics. For example, an output of flip-flop 71, and an output of flip-flop 73 are coupled to inputs of EX-OR gate 74. The output of EX-OR gate 74 is coupled to one input of flip-flop 69. This interconnection provides a counter which cyclically counts to 31. NOR gates 75, 76 and 77 have their inputs connected to outputs of certain ones of flip-flops 69 through 73. These interconnections are made in a manner commonly known in the art so that each gate recognizes a predetermined count. The output of NOR gate 75 is coupled to one input of flip-flop 78. Another input to flip-flop 78 is coupled from an output of flip-flop 65 in counter 23. The output of flip-flop 78 is coupled to one input of NAND gate 79. A second input to NAND gate 79 is connected to the output of flip-flop 110. The output of NAND gate 79 is coupled to one input of NAND gate 80, and the second input to NAND gate 80 is coupled from input terminal 80. The output of NAND gate 80 is coupled through inverter 81 to terminal 82.

The output of NOR gate 76 is coupled through inverter 83 to two inputs of flip-flop 64, and to the input of inverter 84. The output of inverter 84 is coupled to terminal 88. The output of inverter 84 is also connected to an input of flip-flops 90 and 91. A second input to flip-flop 90 is connected to input terminal 63, and a second input to flip-flop 91 is connected to input terminal 63 through inverter 92. The output of inverter 92 is also coupled to the input of flip-flop 110.

The output of NOR gate 77 is coupled to the second input of flip-flop 110. The output of flip-flop 110 is coupled through inverter 111 to output terminal 112. The output of flip-flop 110 is also coupled to an input of flip-flop 89. One output of flip-flop 89 is coupled to an input of NAND gates 95 and 114. The output of NAND gate 95 is coupled to one input of NAND gate 96. A second input to NAND gate 96 is coupled from the output of inverter 68 in counter 23. The output of NAND gate 96 is coupled through inverter 97 to terminal 98.

A second output of flip-flop 89 is coupled back to an input of flip-flop 89, and through inverter 101 to output terminal 102. The output of flip-flop 89 coupled back to the input is also coupled to one input of NAND gates 103 and 115. The output of NAND gate 103 is coupled to one input of NAND gate 104. A second input to NAND gate 104 is coupled from the output of inverter 68. The output of NAND gate 104 is coupled through inverter 105 to terminal 106.

The output of flip-flop 110 is also coupled to one input of NAND gate 113. The second input to NAND gate 113 is coupled from an output of flip-flop 90. The output of NAND gate 113 is coupled to one input of NAND gates 114 and 115. The output of NAND gate 114 is coupled through inverters 116 and 117 to output terminal 118. The output of NAND gate 115 is coupled to output terminal 119.

The output of flip-flop 90 coupled to one input of NAND gate 113 is also coupled to one input of NOR gates 123 and 124. The second output of flip-flop 90 is coupled to NOR gate 125 and to flip-flops 69 and 70. An output of flip-flop 91 is coupled to one input of NOR gates 123 and 125. The output of NOR gate 125 is coupld to terminal 126. The output of NOR gate 123 is coupled to terminal 130 and to second inputs of NAND gates 103 and 95. The second output of flip-flop 91 is also coupled to the second input of NOR gate 124. The output of NOR gate 124 is coupled to terminal 131.

Figure 3:
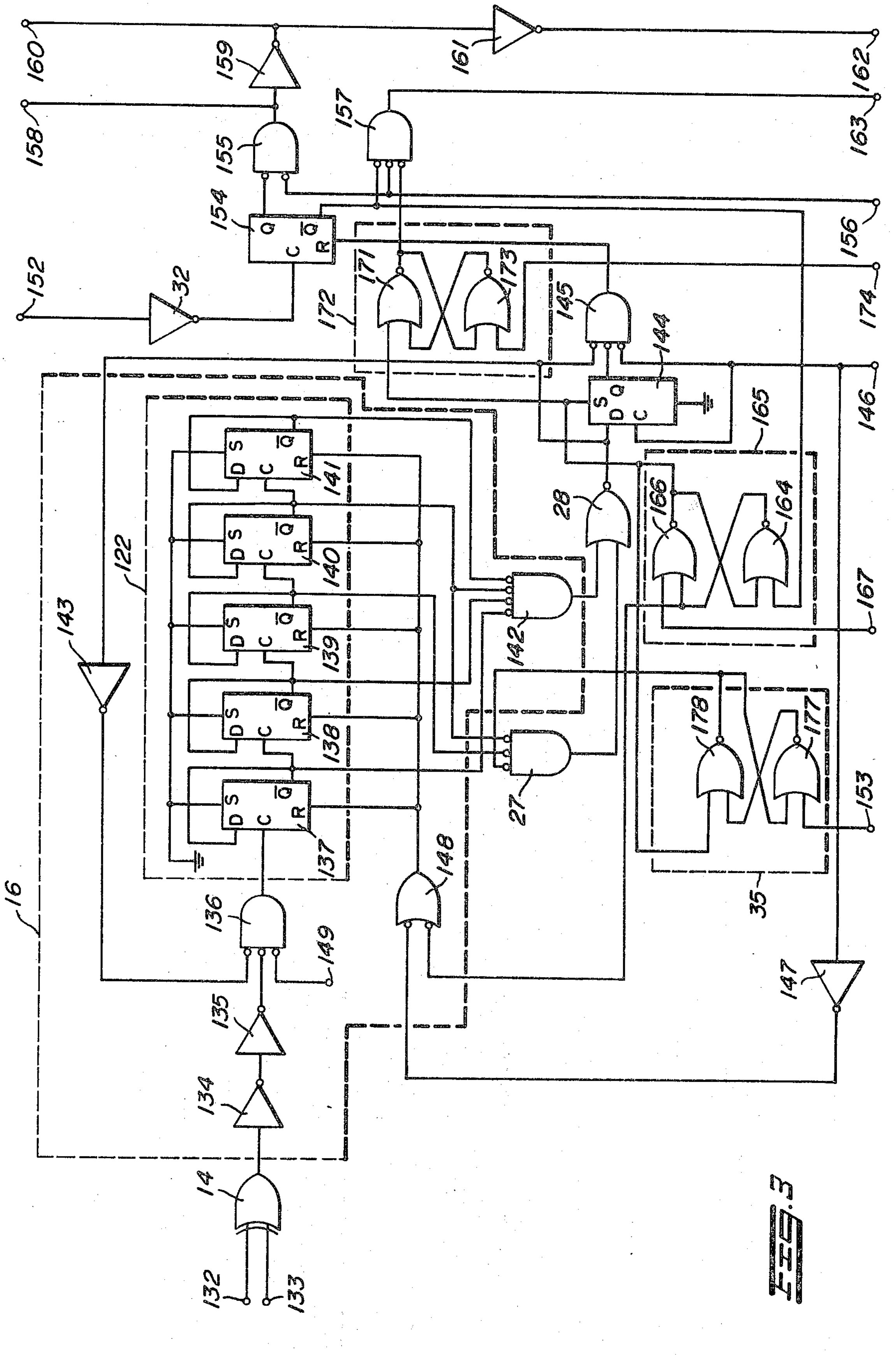
FIG. 3 is a block diagram showing in greater detail the signal correlator and signal strobe generator of FIG. 1 and certain portions of the input circuitry connected thereto.

Referring to FIG. 3, terminals 132 and 133 are coupled to the two inputs of EX-OR circuit 14. The output of EX-OR circuit 14 is coupled to inverter 134. The output of inverter 134 is coupled through inverter 135 to one input of NOR gate 136. Terminal 149 is connected to a second input of NOR gate 136. The output of NOR gate 136 is coupled to the first stage of a five stage shift register/counter 122 consisting of flip-flops 137 through 141. These stages are connected in a normal manner for sequentially counting signals coupled from NOR gate 136. This interconnection need not be described in detail as such interconnections are commonly known to those skilled in the art.

NOR gate 27 has two inputs coupled to certain stages of counter 122 and NOR gate 142 has four inputs connected to the outputs of certain stages of counter 122. Both NOR gates 27 and 142 are connected in a manner commonly known in the art to recognize a predetermined count. The outputs of NOR gates 27 and 142 are coupled to the two inputs of NOR gate 28. The output of NOR gate 28 is coupled through inverter 143 to a third input of NOR gate 136, to an input of flip-flop 144, and to an input of NOR gate 145. A second input to flip-flop 144 and a second input to NOR gate 145 is coupled from input terminal 146. Input terminal 146 is also coupled through inverter 147 to one input of NAND gate 148. The output of NAND gate 148 is coupled to inputs of flip-flops 137 through 141.

Timer 30, shown in FIG. 1, is connected to input terminal 153 of flip-flop 35, and from input terminal 152 through inverter 32, to one input of flip-flop 154. A second input of flip-flop 154 is connected to the output of NOR gate 145. One output of flip-flop 154 is coupled to an input of NOR gate 155. The second input to NOR gate 155 comes from terminal 156. The output of NOR gate 155 is coupled to terminal 158, through inverter 159 to terminal 160, and from the output of inverter 159 through inverter 161 to terminal 162.

The second output of flip-flop 154 is coupled to one input of NOR gate 157 and to an input of NOR gate 164 in flip-flop 165. A second input of NOR gate 157 is connected to input terminal 156 as is NOR gate 155. The output of NOR gate 157 is coupled to terminal 163.

A second input to flip-flop 165 is coupled to NOR gate 166 from input terminal 167. One output of flip-flop 165 is coupled to an input of NAND gate 148, the other output of flip-flop 165 is coupled to one input of flip-flop 144, one input of NOR gate 171 in flip-flop 172, and one input of NOR gate 178 in flip-flop 35. The output of flip-flop 35 is connected to one of the inputs of NOR gate 27. The output of flip-flop 144 is coupled to one input of NOR gate 145. An input to NOR gate 173 in flip-flop 172 is connected from input terminal 174. The output of flip-flop 172 is coupled to a third input of NOR gate 157.

OPERATION

SYSTEM TIMING

Figure 4:
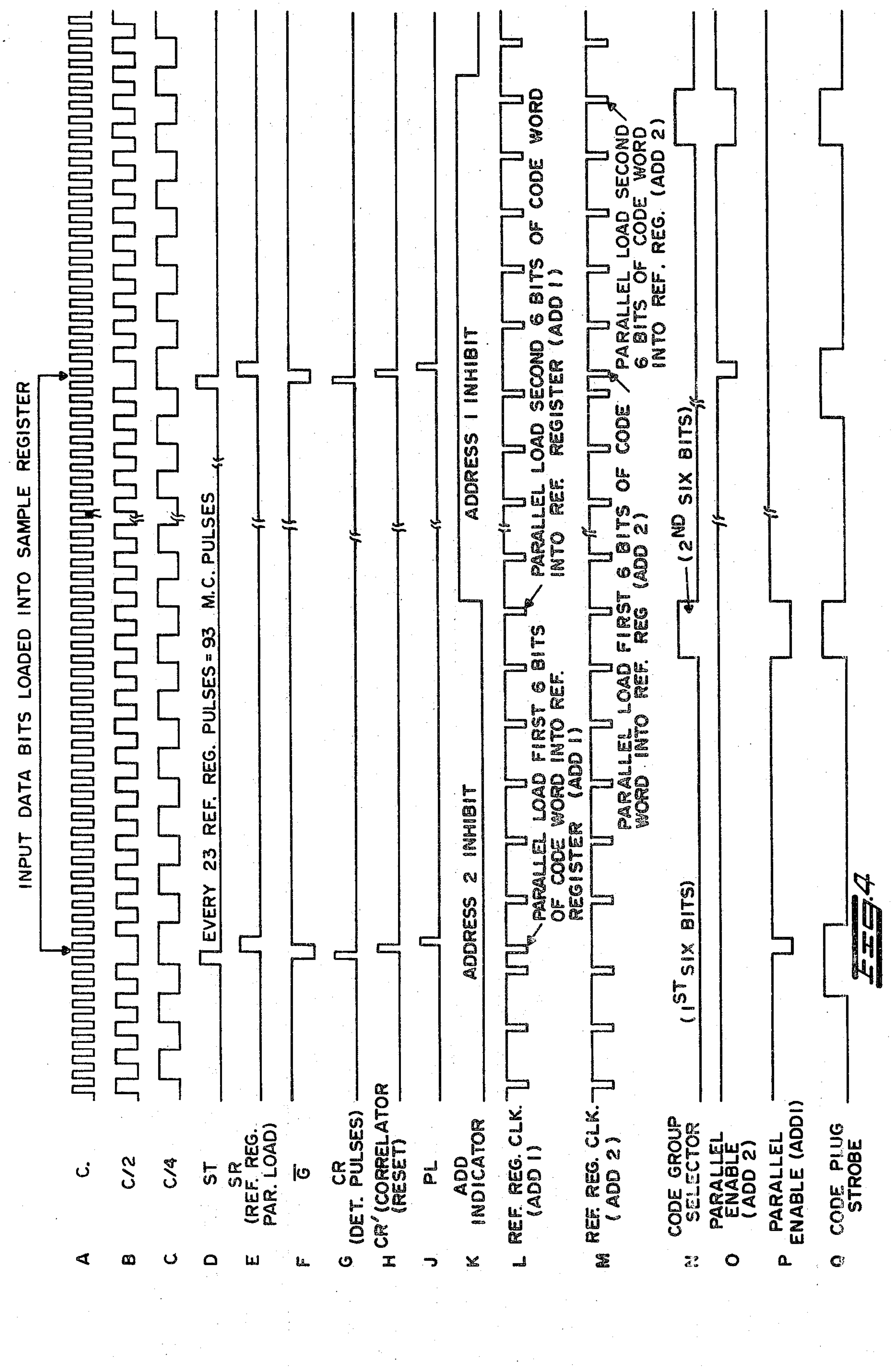
FIG. 4 is a timing diagram of the timing signals developed by the clock circuitry and the decoder timing generator.

Referring to FIGS. 1, 2 and 4, clock signals are continuously developed by clock 20 and are coupled through gate 21 to input terminal 63 of decoder timing generator 12. In the preferred embodiment, clock 20 develops square wave signals, or pulses having a frequency of approximately 112 KHz. These are shown in FIG. 4A. The clock pulses coupled to terminal 63 are coupled to inputs of flip-flops 64 and 65 in counter 23. Flip-flops 64 and 65 and NOR gate 66 act as a synchronous counter which divides the clock signals by two and four, respectively. The clock signals divided by two are coupled to conductor 67, and the clock signals divided by four are coupled to the input of inverter 68 from the output of NOR gate 66. FIG. 4B shows the clock signals or pulses divided by two (C/2) and FIG. 4C shows the clock pulses divided by four (C/4).

The clock pulses divided by four (C/4) are coupled from the output of NOR gate 66 through inverter 68 in divider circuit 23 to the clock input of flip-flop 69 of decoder timing generator 12. NOR gate 76 will develop an output signal or pulse which is one clock pulse period long, upon each 23 count of counter 62. For later understanding, we shall consider this the reference or ST pulse, and it is represented in FIG. 4D. NOR gate 75 develops an output signal or pulse which is five clock pulse periods long for every 22nd count of counter 62, and NOR gate 77 develops an output pulse for the fifth count after every 23rd count developed by counter 62. For later understanding, we shall refer to these as the minus one (−1) and plus five (+5) pulses, respectively. The ST pulse developed by NOR gate 76 is coupled through inverter 83 to the JK inputs of flip-flop 64. This inhibits flip-flop 64 from recognizing, or counting another clock pulse during the clock long period of the ST pulse. Because the counting of the clock pulse by flip-flop 64 is inhibited during the ST pulse, we effectively develop the ST pulse ever 93rd clock pulse. The purpose for inhibiting one count during the ST pulse will be more clearly understood when the operation of sample register 13 is described in greater detail.

The ST pulse at the output of inverter 83 is also coupled through inverter 84 to output terminal 88, and to flip-flop 90 and 91. A clock pulse is coupled to the input of flip-flop 90 from terminal 63, and an inverted clock pulse is coupled to clock input of flip-flop 91 through inverter 92 from input terminal 63. The ST pulse coupled to flip-flop 90 will cause it to change states when the clock pulse is received and develop an SR pulse at the Q output and an $\overline{SR}$ at the $\overline{Q}$ output. The SR pulse is shown in FIG. 4E. The SR pulse is coupled to flip-flops 69 and 70 causing them to reset, terminating the 23 count of counter 62 and terminating the ST pulse. By terminating the count of counter 62 after a 23 count, the combination of counters 23 and 62 counts to 92 before developing the ST pulse, resetting and beginning another count. As noted above, however, the counter inhibit produced by the ST pulse causes the ST pulse to be developed every 93rd count. The SR pulse occurs one full clock period after the beginning of the ST pulse and lasts for one clock pulse period. With the ST pulse terminated, the SR pulse will last until the occurrence of the positive going edge of the next clock pulse coupled to flip-flop 90.

The ST pulse coupled to/flip-flop 91 and the positive going portion of the inverted clock pulse coupled to flip-flop 91 cause a G signal or pulse to be developed at the Q output of flip-flop 91, and a $\overline{G}$ signal to be developed at the $\overline{Q}$ output. This pulse occurs one-half (½) clock period after the beginning of the ST pulse and lasts for one clock pulse period. The $\overline{G}$ pulse is shown in FIG. 4F.

The SR pulse developed at the Q output of flip-flop 90 and the $\overline{G}$ pulse developed at the $\overline{Q}$ output of flip-flop 91 are coupled to NOR gate 125. NOR gate 125 will develop a CR pulse in response to the pulses coupled thereto, shown in FIG. 4G. The CR pulse has a time duration of C/2, or one-half the clock pulse period, and will occur one-half (½) clock period after the start of the ST pulse. The $\overline{SR}$ pulse and $\overline{G}$ pulse developed by flip-flops 90 and 91, respectively, are coupled to NOR gate 123. NOR gate 123 will develop a CR' pulse at its output in response to the signals coupled thereto. This CR' pulse will occur one clock period after the start of the ST pulse as shown in FIG. 4H.

The $\overline{SR}$ pulse developed by flip-flop 90 and the G pulse developed by flip-flop 91 are also coupled to NOR gate 124. NOR gate 124 develops a PL pulse in response to the pulses coupled thereto which is shown as FIG. 4J. The PL pulse occurs one and one-half (1½) clock periods after the ST beginning of the ST pulse. This PL pulse is coupled to output terminal 131.

With a one level signal coupled from the $\overline{Q}$ output of flip-flop 89 to NAND gate 103, and upon the occurrence of a CR' pulse or a one level signal at NAND gate 103, a zero level signal will be developed at the output of NAND gate 103. If a C/4 count has not occurred, and the output of inverter 68 is at a one level, the one level from inverter 68 and the zero level from NAND gate 103 will cause NAND gate 104 to change from a zero to a one level. When inverted by inverter 105 and coupled to output terminal 106, it will appear as the additional pulse shown in FIG. 4L and identified by the arrow and phrase "parallel load first six bits of code word into reference register (Add 1)."

The pulse developed on the fifth count after the ST pulse (plus five pulse) as noted above is developed by NOR gate 77 and coupled to flip-flop 110. Inverted clock pulses are coupled to flip-flop 110 from the output of inverter 92. The presence of both pulses will cause flip-flop 110 to change states and develop a zero signal at the $\overline{Q}$ output. As the signal from NOR gate 77 will last until counter 23 again counts to four, the $\overline{Q}$ output will remain at a zero level for four clock pulse periods. This signal is coupled through inverter 111 to output terminal 112. The pulse developed at output terminal 112 is shown in FIG. 4N and is referred to as the "code group select pulse."

The code group select pulse developed by flip-flop 110 is coupled to the clock input of flip-flop 89 causing flip-flop 89 to change states. Because of the connection between the $\overline{Q}$ output of flip-flop 89 and the D input, flip-flop 89 will change states on each pulse from flip-flop 110. Both the Q and $\overline{Q}$ outputs will alternate between the zero and the one state. The $\overline{Q}$ output of flip-flop 89 is also coupled through inverter 101 to terminal 102. The signal developed at terminal 102 is shown in FIG. 4K and is referred to as the address indicator signal. The signal developed at the Q output of flip-flop 89 is also coupled to inputs of NAND gates 103 and 115. The signal developed at the Q output of flip-flop 89 is coupled to inputs of NAND gates 95 and 114. The CR' pulse, previously discussed is coupled to the second inputs of NAND gates 103 and 95. With a one level signal coupled from the $\overline{Q}$ output of flip-flop 89 to NAND gate 103, and the absence of a CR' pulse or a zero level signal at the second input of NAND gate 103, a one (1) level signal will be developed at the output of NAND gate 103. On every fourth count (C/4) by counter 23 a count (Zero level) signal will be developed at the output of inverter 68 which will be coupled to the second input of NAND gate 104.

This zero level signal from inverter 68 along with the positive or one (1) level signal coupled from NAND gate 103 will cause the output of NAND gate 104 to change from a zero to a one level. This pulse is coupled through inverter 105 to output terminal 106. The pulse developed at output terminal 106 is termed the "reference clock pulse" and will occur every fourth clock pulse. FIG. 4L shows the reference register clock pulses (address register 1) developed at terminal 106.

NAND gates 95 and 96 operate in the same manner as NAND gates 103 and 104. That is, both produce reference register clock pulses. The reference register clock pulses (address register 2) developed by NAND gates 95 and 96 are coupled through inverter 97 to terminal 98, and are shown in FIG. 4M. As can be seen by reference to FIGS. 4L and 4M, the additional clock pulse alternates between terminals 98 and 106 every 92 count cycle. This is due to the alternating of flip-flop 89.

The pulses at the $\overline{Q}$ output of flip-flop 110 are also coupled to one input of NAND gate 113 and one input of NAND gate 79. The second input to NAND gate 113 is coupled from the $\overline{Q}$ output of flip-flop 90 when a zero level signal is present at the $\overline{Q}$ output of flip-flop 90 or 110, the output of NAND gate 113 will be a one. The zero signal level will only be present at the $\overline{Q}$ outputs of flip-flops 90 or 110 when the SR pulse is being developed by flip-flop 90 or when the code group select pulse is being developed by flip-flop 110, respectively. With the output of NAND gate 113 at a one level, NAND gates 114 and 115 will change from a one level to a zero level at the output when a one level signal is coupled from the $\overline{Q}$ output of flip-flop 89 to the second input of NAND gate 95, and when a one level signal is coupled from the Q output of flip-flop 89 to the second input of NAND gate 115. As previously noted, the SR pulse is developed for one clock period, and the code group select pulse is developed for four clock periods. The output then of NAND gate 95 will change from a one level to a zero level for either one clock period or four clock periods depending on whether flip-flop 90, or 110 couples a zero level signal to NAND gate 113, and depending upon the signal level coupled by flip-flop 89 to NAND gate 95. NAND gate 115 will behave in exactly the same manner. The output of NAND gate 114 is coupled through inverters 116 and 117 to output terminal 118. The signals appearing at output terminal 118 are shown in FIG. 40. The output of NAND gate 115 is coupled to output terminal 119. The signals appearing at the output terminal 119 are shown in FIG. 4P. As can be seen by reference to FIG. 4, waveform O and P are identical except the signals alternate between terminals 118 and 119 every 92 count cycles or every 23 count cycle of counter 62.

The minus one (−1) count pulse developed at the output of NOR gate 75 upon detection of a 22 count is coupled to the D input of flip-flop 78, and the pulse developed at the $\overline{Q}$ output of flip-flop 65 upon the appropriate count is coupled to the C input of flip-flop 78. The presence of both signals will cause flip-flop 78 to change states and couple a zero level signal from the $\overline{Q}$ output to NAND gate 79. If flip-flop 110 changes states in response to a plus five (+5) count its output will change from a plus one (+1) to a zero level. If a zero level is coupled to either input of NAND gate 79, NAND gate 79 will change states and develop a one level signal at its output which is coupled to NAND gate 80. The presence of a signal strobe having a one level signal coupled from signal strobe generator 29 to input terminal 129, and a one level signal at the output of NAND gate 79 will cause NAND gate 80 to change states and develop a zero level signal at the output. This zero level signal is inverted by inverter 81 and coupled to output terminal 82. The signal developed at output terminal 82 is called the code plug strobe and is shown in FIG. 4Q.

PRELIMINARY SYSTEM EXPLANATION AND SAMPLE REGISTER OPERATION

The asynchronous digital sequence detector of this invention is designed to recognize the receipt of two binary words sequentially transmitted. In order to operate in an asynchronous mode, at least the first digital word must be a binary word which is a subset of a cyclic code. An asynchronous digital detector which recognizes a binary word that is a subset of a cyclic code, the characteristics of that word, and the characteristics of the detector which minimize false detection are described in the above noted Braun, et al., application. In the preferred embodiment of this application, a 23 bit binary word is employed as the first word in the two word sequence which is a subset similar to that shown and described in Braun, et. al., and satisfying at least the same system requirements and parameters as specified therein. Each binary bit in both words to be received by the digital detector of the preferred embodiment has a predetermined time period. The second word is also a 23 bit word in the preferred embodiment, however, it need not be a subset of a cyclic code.

Referring to FIG. 1, a train of signals is coupled to input terminal 10. The train of signals will include the two binary words in sequence which are to be detected. It is to be understood that the signals coupled to terminal 10 may have been transmitted from a remote sight via a modulated radio frequency (RF) signal, and received by the receiver portion of, for example, a paging device. The receiving portion of the pager wherein the modulated RF signal is detected and converted in order to reproduce the train of signals is not shown as such design is commonly known to those skilled in the art. In the preferred embodiment, sample register 13 is a multi-stage shift register. The ST (reference) pulses previously described are coupled from terminal 88 in decoder timing generator 12 to control gate 11. Control gate 11 operates in response to the ST pulse to open a normally closed path between the output or last stage of sample register 13; and to close a path from input terminal 10 to the input of sample register 13. This allows the binary signal train appearing at input terminal 10 to be coupled to the first stage of sample register 13. At the same time as an ST pulse is developed, a clock pulse is also coupled from clock 20 through gate 21 to sample register 13. This clock pulse causes sample register 13 to sample the signal appearing at the input of the first stage and enter a binary signal corresponding to that sample into the first stage. It also causes sample register 13 to shift the contents of each stage to the succeeding stage. Because the last stage of sample register 13 is not coupled back to the input or first stage of sample register 13 during this sequence, the binary signal in the last stage of sample register 13 will be lost.

Four clock pulses are developed during the interval of a bit period. Four binary signals therefore will be entered into the first stage of sample register 13 during each bit period interval. Sample register 13 is comprised of a sufficient number of stages to store four samples for each bit in either the first or second predetermined binary word in the sequence to be detected. As the first and second binary words in the preferred embodiment each consist of 23 bits, and as four samples are taken during the interval of a bit period, sample register 13 will contain 92 stages.

Between each ST pulse, clock pulses are continuously developed by clock 20 as noted above and coupled through gate 21 to sample register 13. When the ST pulse is not coupled to sample register 13, the output of sample register 13 is coupled back to the input through control gate 11. As previously noted an ST pulse occurs after 92 clock pulses. The 92 clock pulses coupled to sample register 13 between each ST pulse will cause the binary signals stored therein to completely cycle through sample register 13 from their respective stages to the output back to the input and through the stages to their original stage. The binary signals in the sample register 13 are then cyclically shifted through the stages.

SIGNAL CORRELATOR/SIGNAL STROBE GENERATOR OPERATION

The purpose of the signal correlator and signal strobe generator circuitry is to provide a battery saver or power economizer feature for the digital sequence detector and the paging receiver with which it is associated. In general, this circuitry causes actuation of the detector and receiver every 528 milliseconds for a period of up to 130 milliseconds. If the circuitry determines that intellegible data is being received, it will maintain the receiver and decoder circuit in an operable condition. If it determines that intellegible data is not being received it will terminate operation of the receiver and detector after 130 milliseconds.

Figure 5:
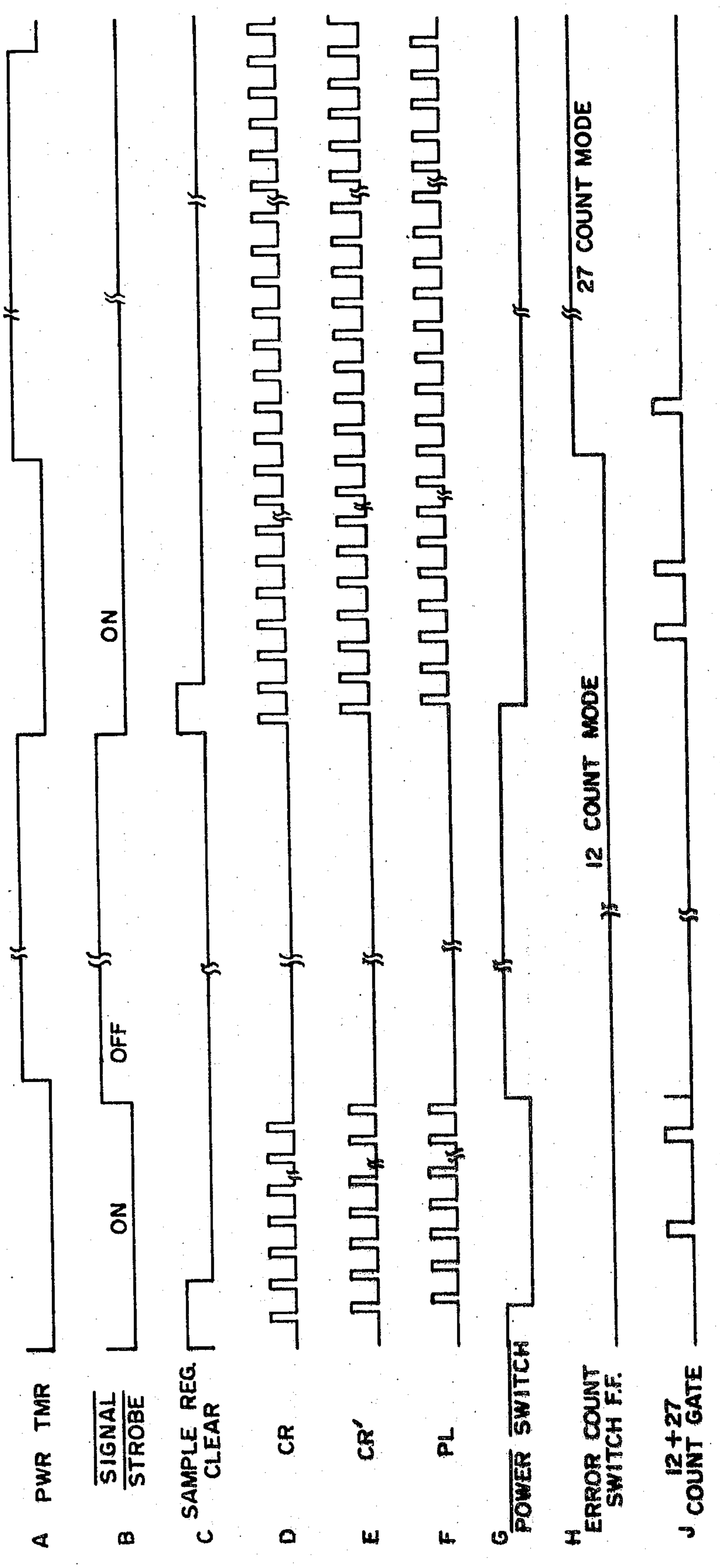
FIG. 5 is a timing diagram showing timed operation for various portions of the signal correlator.

Referring to FIGS. 1 and 3, timer counter 30 provides the necessary timing mentioned above. It includes a precision oscillator circuit and counters for counting the 130 millisecond and the 528 millisecond time periods. During the 130 millisecond time period, a zero level state is developed at the output of timer counter 30, and during the 528 millisecond period a one level state is developed at the output of timer counter 30. FIG. 5A shows the power timer signal developed at the output of timer counter 30.

The counter timer signal is coupled to input terminal 152, and to flip-flop 35. The power timer signal coupled to input terminal 152 is coupled through inverter 32 to the clock input of flip-flop 154 in signal strobe generator 29, causing it to change states and develop a one level signal at the Q output and a zero level signal at the $\overline{Q}$ output. NOR gate 155 will change from a one to a zero level signal at its output in response to the change of state from flip-flop 154. The zero level signal developed at the output of NOR gate 155 is coupled to output terminal 158. This signal is entitled "signal strobe" and is shown in FIG. 5B. The signal strobe is coupled from terminal 158 to the second input of NOR gate 21. Gate 21 responds to zero level, the signal strobe to allow clock pulses developed by clock 20 to be coupled through to the various circuits. The signal strobe is therefore the signal which initializes operation of the entire detector by allowing signals to be coupled from counter 20 through NOR gate 21 to the various circuits in the detector. The signal strobe developed at the output of NOR gate 155 is also coupled through inverter 159 to output terminal 160. This inverted signal strobe is coupled to input terminal 129 in FIG. 2, and then to NAND gate 80 in decoder timing generator 12. The signal strobe signal is the second input necessary in order to cause NAND gate 80 to change state and develop the code plug strobe shown in FIG. 4Q, and previously discussed. The output of inverter 159 is also coupled through inverter 161 to output terminal 162. Output terminal 162 is connected to the power input leads of the various portions of the paging receiver. When the signal strobe signal is present at output terminal 162, power is supplied to the remaining circuitry of the paging receiver, so that it may receive and convert signals and couple the signals to input terminal 10. As can be seen, then, the entire detector and the receiver associated with the detector is turned off, and only timer counter 30 is in an operative state, during the above described 528 millisecond time period. Upon development of the power timer signal by timer counter 30 the detector and associated receiver is energized. Once the detector is energized as mentioned above, clock pulses are coupled to sample register 13 causing the information located therein to circulate therethrough from input to output, and to counters 23 and 62 allowing them to continue counting. Sample (ST) pulses, when generated, are also coupled to control gate 11 for allowing the sampling of the binary signal train coupled to input terminal 10. Note at this time that counters 23 and 62 when previously energized may have counted to any number. The generation of the signal strobe will not initialize a new count but only cause the counters to continue their prior count.

The zero level signal developed at the Q output of flip-flop 154, when it changes states is coupled to one input of NOR gate 157. A second input to NOR gate 157 is coupled from terminal 156 and is maintained at a zero level if the battery saver feature is being used, that is, if the signal strobe is turning the detector on and off as previously noted. A third input to NOR gate 157 is coupled from flip-flop 172 and is also at a zero level. With all three inputs to NOR gate 157 at a zero level, the output will go to a one level and couple this one level signal to output terminal 163. The signal appearing at output terminal 163 is called the "sample register clear signal" and is shown in FIG. 5C. Output terminal 163 is connected to the reset input of the last stage in sample register 13. The purpose of coupling this signal to sample register 13 is to cause all the signals in sample register 13 to be set to zero as the signals are cycled from input to output through sample register 13. This initializes the condition of the sample register so that only signals entering subsequent to this initialized condition will be correlated by signal correlator 16.

The zero level signal developed on the $\overline{Q}$ output of flip-flop 154 is also coupled to the input of NOR gate 164 in flip-flop 165. The first PL pulse developed after initialization by the generation of the signal strobe and operation of decoder timing generator 12 will be coupled to input terminal 167. Note that the PL pulse is generated one and one-half (1½) clock pulses after the first 92nd count. In order to simplify the timing relationships for signal strobe generator 29, the CR pulses, CR′ pulses and PL pulses shown in FIGS. 4G, 4H, 4J, are reproduced in FIGS. 5D, 5E and 5F, respectively, and in timing relation with the other waveforms of FIG. 5. The PL pulse is shown inverted, or as a $\overline{PL}$ pulse for clarity. From input terminal 167 it will be coupled to the input of NOR gate 166 in flip-flop 165 causing flip-flop 165 to change states. Prior to the chage of state of flip-flop 165 a zero level signal was coupled from the output of NOR gate 164 to an input of NAND gate 148. This zero level signal caused a one level signal to be developed at the output of NAND gate 148 which was coupled to the reset inputs of flip-flops 137 in counter 122, through 141, preventing these flip-flops from counting any signals coupled thereto. Upon receipt of the PL pulse by flip-flop 165 it will change states and couple a one level signal to the input of NAND gate 148. The other input to NAND gate 148 is an inverted CR signal. This is normally a one level signal except for when a CR pulse is being developed. As a consequence, the output of NAND gate 148 is normally a zero level signal except when a CR pulse is developed. When a CR pulse is developed, the output of NAND gate 148 will change to a one, resetting counter 122. Counter 122 then is reset by every CR pulse and then must begin a new count.

A second output of flip-flop 165 is coupled from the output of NOR gate 166 to the S input of flip-flop 144 and to one input of NOR gate 171 in flip-flop 172. When flip-flop 165 changes state in response to the PL pulse, the output of NOR gate 166 will change from a one to a zero level. This signal at the output of NOR gate 166 is termed $\overline{\text{Power Switch}}$ signal and is shown in FIG. 5G. The zero level when coupled to the input of NOR gate 171 in flip-flop 172 will set flip-flop 172. Counters 23 and 62 now go through an entire counting cycle. The next CR′ pulse which follows the PL pulse that caused flip-flop 165 to change states when coupled from decoder timing generator 12 to input terminal 174, and then to NOR gate 173 in flip-flop 172 will cause flip-flop 172 to change states.

When flip-flop 172 changes states, the output of NOR gate 171 will go from a zero to a one level. This one level is coupled to NOR gate 157 causing the output of NOR gate 157 to revert to a zero level. This zero level is coupled to terminal 163 and from terminal 163 to sample register 13 allowing sample register 13 to enter subsequently sampled binary signals. The sample register clear signal is then terminated as shown in FIG. 5C.

As previously mentioned, the power timer signals developed by timer counter 30 is also coupled to input terminal 153 of flip-flop 35. When flip-flop 35 is initialized, it will develop a zero level signal at the output of NOR gate 178 which is coupled to NOR gate 27. The other inputs to NOR gate 27 are coupled from selected outputs of flip-flops 137 through 141 in counter 122. In the preferred embodiment, the $\overline{Q}$ outputs are used. As no count is present at this point, the outputs from the flip-flops connected to NOR gate 27 will be at a one level so that the output of NOR gate 27 will be a zero level. When flip-flop 165 receives the first PL pulse after initialization, and switches states, the changed state will be coupled from the output of NOR gate 166 to the input of NOR gate 178 in flip-flop 35, setting flip-flop 35. When the power timer signal terminates as shown in FIG. 5A, that is, when the power timer signal reverts to a one level, flip-flop 35 will change states and the output of NOR gate 178 will go from a zero level signal to a one level signal. The output of flip-flop 35 is shown in FIG. 5H. This one level signal when coupled to the input of NOR gate 27 will prevent the output of NOR gate 27 from changing from a zero to a one state. NOR gate 27, in the preferred embodiment, will change states in response to a twelve count in counter 122. By inhibiting a change in states in NOR gate 27, via flip-flop 35, only NOR gate 142 will be allowed to change states upon the appropriate count. NOR gate 142, will respond to a 27 count in counter 122 and change states. The change of state by NOR gate 27 and 142 is shown in FIG. 5J. The samples in the last two stages of sample register 13, that is, stages 91 and 92 of sample register 13 should contain binary signals which correspond to two samples taken during a bit period. Because an information or parity bit does not change states during a bit period, these samples should be identical. If they are not identical, it can be due to one of two causes. First, it can be because noise signals and not information signals have been received and stored in sample register 13. Second, it can be because the sample stored in stage 92 of sample register 13 was the fourth sample taken during the interval of one bit period, and the sample stored in stage 91 of sample register 13 is the first of the four samples taken during the succeeding binary bit period. The $\overline{Q}$ output of stage 92 and the Q output of stage 91 of sample register 13, are coupled to exclusive OR gate 14. If the signals coupled to exclusive OR gate 14 are identical, indicating a lack of correlation in binary signals, the output of exclusive OR gate 14 will be a zero. If the signals coupled from the last two stages of sample register 13 are not identical, indicating a correlation between the signals in stages 91 and 92, the output of exclusive OR gate 14 will be a one. If a zero is present at the output of EX-OR gate 14, a zero will be developed at the output of inverter 135. If a one is developed at the output of EX-OR gate 14, a one level will be developed at the output of inverter 135. The output of inverter 135 is one input of NOR gate 136. The second input of NOR gate 136 is coupled from terminal 147 which is coupled to the output of NAND gate 22. NAND gate 22 receives clock signals from gate 21 and clock signals over two (C/2) from counter 23. NAND gate 22 will therefore only change states and develop a zero level output every C/2 pulse, or every other clock pulse. The third input to NOR gate 136 will be zero except as explained in a later portion of the application. The output of NAND gate 22 acts to clock signals from inverter 135 through NOR gate 136. That is, if a clock pulse and clock pulse over two (C/2) are coupled to NAND gate 22, the output will switch from a one to a zero level. This zero level signal, coupled to NOR gate 136, if a zero level signal is present at the output of inverter 135 due to a miscorrelation, will cause the output of NOR gate 136 to switch from a zero to a one level. This one level signal will be clocked into stage 137 of counter 122 in signal correlator 16. Again, note that signals will only be clocked through NOR gate 136 upon every other clock pulse. In that way, the two bits sampled in stages 91 and 92 by EX-OR gate 14 will differ for each sampling. This sampling will continue to occur on every other clock pulse. As the samples in sample system 13 shift a stage on each clock pulse, all of the binary signals stored in sample register 13 are compared in groups of two. Every miscorrelation will be counted by counter 122. Flip-flops 137 through 141 in counter 122 will be reset and a new counting sequence will be initiated upon receipt of each CR pulse, as previously noted, if the entire detector operation has not been terminated. As a CR pulse follows an ST pulse, a new counting and comparing cycle will be initiated after each sample is taken.

If 12 miscorrelations have been counted by counter 122 subsequent to system initialization and between any two consecutive CR pulses, NOR gate 27 will change states and develop a one level signal at its output. This, of course, assumes that the power timer signal has not terminated, preventing the change of state of NOR gate 27. This one level signal is represented in FIG. 5J and is coupled to NOR gate 28 causing the output of NOR gate 28 to change from a one to a zero level. This zero level signal at the output of NOR gate 28 will be coupled through inverter 143 back to the input of NOR gate 136 inhibiting gate 136 from coupling any further signals therethrough to the clock input of flip-flop 137, in counter 122 and thus terminating any additional count. The output of NOR gate 28 will also be coupled to the D input of flip-flop 144 and to one input of NOR gate 145. Upon receipt of the next developed CR pulse, the zero level signal coupled to the D input of flip-flop 144 will be clocked into flip-flop 144 causing the Q output to change from a one to a zero level. This zero level at the output of flip-flop 144 will be coupled to a second input of NOR gate 145. Signal correlator 16 now begins again to count miscorrelations, after being reset by the above-noted CR pulse. If a 12 or greater count of miscorrelations is not recognized prior to the receipt of the next succeeding CR pulse, the outputs of gates 27 and 142 will remain at zero and the output of NOR gate 28 will remain at one. The next succeeding CR pulse will cause the one level signal to be clocked into the flip-flop 144 thus causing the Q output of flip-flop 144 to revert to a one level. In effect, this puts generator 29 back to an initialized correlation. If, however, twelve miscorrelations are again counted, by counter 122 prior to power timer signal termination and another CR pulse, NOR gate 27 will change states and develop a one level signal at its output. This will cause NOR gate 28 to also change states and again develop a zero level signal at its output. Again, the signal coupled through inverter 143 will inhibit further counting by counter 122. All the inputs to NOR gate 145 will now be zero causing the output to switch from a zero level to a one level. This one level is coupled to the reset input of flip-flop 154 and will cause 154 to reset. When flip-flop 154 resets, it will terminate the signal strobe thus inhibiting gate 21 from coupling any further clock pulses from clock circuit 20 and inhibiting the coupling of power to the remainder of the detector and paging receiver circuitry associated therewith.

The purpose of the repeat count is to prevent the unit from turning off should the signal in the 92nd stage be the fourth sample in one binary bit and the sample in the 91st stage be the first stage in the succeeding binary bit. Prior to the generation of the first CR pulse which resets counter 122 after the first twelve count, an ST pulse is generated which causes another sampling to be taken and entered into sample register 13. If prior to the sampling, the 92nd stage contained the fourth sample in one binary bit and the 91st stage contained the first sample in a subsequent binary bit; after the ST pulse, the 92nd stage would contain the first sample in the subsequent binary bit and the 91st stage would contain the second sample in the subsequent binary bit. As there are now no overlaps between samples of succeeding words, a miscorrelation count greater than twelve would not occur unless noise were present. Assuming noise were not present, flip-flop 144 would be reset, and continued to look for succeeding miscorrelation counts of 12 or greater. Flip-flop 144 may then be analogized to a two sequence counter. Two miscorrelations if greater than 12, in sequence, must be counted to cause flip-flop 144 to change states and cause termination of operation. If a sequence of two greater than 12, or 27 as the case may be, are not counted, the generator 29 will not cause termination of the detector or pager operation.

Flip-flop 35 prevents abrupt termination of the detector and paging receiver operation in the event that both have been held operative for greater than a predetermined period of time. Should the detector be kept operative for a period greater than the power timer signal, this indicates that a correlated signal is being received. Flip-flop 35 then will change states when the power timer signal terminates, inhibiting recognition of a twelve count. At this point, only a 27 count will be recognized by NOR gate 142 so that 27 miscorrelations must be found out of a total possibility of 46, and this many miscorrelations must be found two times in sequence before the detector and receiver operation is terminated. Operation of the stages is, of course, the same as if 12 miscorrelations were recorded. This prevents abrupt termination of the detector and receiver as a result of short term nulls in the receipt of signal due for example, to high shielding conditions, which cause more than 12 miscorrelation counts to be recorded by signal correlator 16.

BINARY SEQUENTIAL DETECTOR

The two binary words which are to be detected in sequence by the digital detector of this invention are called an address. In many instances, it is desirable to have a detector which is capable of responding to more than one address. Such a capability has been designed into the detector shown in this preferred embodiment. Certain of the functions previously discussed with regard to the decoder timing generator 12 are provided specifically in order to allow detection of more than one address. However, if more than one address is to be detected, a second parity tree 39, reference register 40, multiplex control gate 38 and code plug 36 must be provided. In addition, circuitry duplicating the circuitry shown in FIG. 1 as being necessary for detection of a first address must also be provided. As the timing necessary to provide the capability is most critical, the circuitry to provide this timing is shown and described. The remaining circuitry is easily implemented, by one skilled in the art, making reference to the circuitry shown in FIG. 1, and the circuitry operation for detecting a first address as follows.

Referring to the drawings, terminal 102 is coupled to code plug 36, or to the alternate code plug used for developing the second address if used. When the waveform shown in FIG. 4K, developed at output terminal 102 is at a zero level, address one, or a particular part, thereof, will be capable of being developed by code plug 36 if the code plug strobe shown in FIG. 4Q has actuated or energized code plug 36. With the signal at terminal 102 at a zero level, the second address at the alternate code plug will be inhibited. When the signal developed at output terminal 102 is at a one level, the address developed at code plug 36 will be inhibited while the address developed in the alternate code plug will not be inhibited. The signal developed at output terminal 102 then is necessary primarily when the detector must detect a second address in addition to the first address. This allows the addresses to be alternately developed in their respective code plugs. Reference register 40 and the alternate reference register are then loaded with the appropriate binary word in an alternate manner. That is, after one ST pulse, reference register 40 shown in FIG. 1 will be loaded with the proper word. On the subsequent ST pulse, the alternate register, if present, will be loaded with the appropriate binary word.

Code plug 36 acts as a memory for storing a total of 24 information bits. 12 information bits for the first word in the address and twelve information bits for the second word in the address. A zero level signal coupled from word flip-flop 37 to code plug 36 will cause code plug 36 to couple the first word to reference register 40, and a one level will cause it to couple the second word to reference register 40. If the first word has not been recognized by the detector, word flip-flop 37 will couple a zero level signal to code plug 36 causing code plug 36 to develop the first word in the address.

The "code group select signal" developed at output terminal 112 is also coupled to code plug 36. This signal, determines which six bits in code plug 36, of the 12 information bits in any word in the address are to be selected and coupled to reference register 40. If the output at terminal 112 is high, or at a one level, the first six bits of the 12 information bits will be selected. If the output signal at terminal 112 is low or at a zero level, the second six bits in the 12 information bits are selected. When the detector is initialized and between the ST pulse and the plus five count after the ST pulse, the output of flip-flop 110 will remain at a low or zero level causing the output at terminal 112 to be at the high or one level.

When the code plug strobe shown in FIG. 4Q has been generated, and code plug 36 is energized, the parallel enable signal for address one shown in FIG. 4P will be developed at terminal 119. This parallel enable signal is coupled to multiplex control gate 38. As the first word has not been yet detected, the first six information bits in the first word of the address will, in response to the parallel enable signal, be coupled in parallel to the first six stages of reference register 40 from code plug 36 by multiplex control gate 38. During the occurrence of the parallel enable signal, the extra reference register clock signal previously mentioned, shown in FIG. 4L, is developed at output terminal 106 and coupled to reference register 40. This clock signal will cause the six information bits coupled from code plug 36 by multiplex control gate 38 to reference register 40, to be entered into the first six stages of reference register 40. The information presently in stage six at the time of this extra reference clock signal will be coupled to stage seven in reference register 40. When the parallel enable signal terminates, the multiplex control gate 38 coupling code plug 36 to reference register 40 are closed and a gate coupling the output of parity tree 39 to the first stage of reference 40 is open. After the termination of this extra reference register clock pulses as shown in FIG. 4L, five more reference register clock pulses will occur, one every fourth clock pulse. These five reference register clock pulses are coupled to reference register 40 causing the binary information in each stage to be shifted to the succeeding stage. At this time, multiplex control gate 38 couples the output of parity tree 39 to the input of the first stage of reference register 40. The second code plug strobe signal shown in FIG. 4Q will be developed and coupled to code plug 36 and multiplex control gate 38, respectively. With a code group select signal for the first word still being coupled to code plug 36, the second six bits of the 12 information bits will be developed and coupled to reference register 40 by multiplex control gate 38. The next reference register clock pulse is also developed at this time causing these six information bits to be loaded into the first six stages of reference register 40. The information bits in stages six through eleven will be shifted one stage and the entire 12 information bits will have been loaded into reference register 40 so that the entire word and all parity bits can be developed therein. The parity bits are generated based on combinations of the information bits. The output of reference register 40 in the preferred embodiment is taken from the output of stage six and coupled to one input of exclusive OR gate 15. The reason for taking the output from the output of stage six is so that after generation of an ST pulse, when the system timing is initialized, the first information bit in the word, and therefore, the first bit in the word will be in stage six of reference register 40. The first bit can then be compared in EX-OR gate 15 with the output of the last stage in sample register 13. This allows an entire word, beginning with the first bit in the word, to be looked for in its entirety between each ST pulse.

For further explanation, assume at this time that 92 samples have been taken in response to 92 ST pulses and 92 samples corresponding to the correct first binary word in the address are stored in sample register 13. The 92nd clock pulse terminates and the first binary signal, corresponding to the first sample of the first bit, is stored in stage 92 of sample register 13. The first binary information bit in the desired word is stored in stage six of reference register 40. The $\overline{Q}$ output of stage 92 of sample register 13 and the Q output of stage six of reference register 40 are compared by EX-OR circuit 15. If there is a correlation between the two, indicating a miscorrelation between the sample and the binary information bits, a one level signal is developed at the output and coupled to correlator/counter selector 24. If there is a miscorrelation between the two signals, indicating a correlation between the sample and the binary information bit, a zero is developed at the output of EX-OR circuit 15 and coupled to correlator/counter selector 24. With no first word having yet been recognized, word flip-flop 37 is in an initialized state and develops a zero level word control signal that is coupled to correlator/counter selector 24. Correlator/counter selector 24 is responsive to this zero level word control signal indicating that the first word has not yet been recognized, and the error signal developed by EX-OR gate 15, to develop a one level signal and couple this to word correlator/sample counter 43. Word correlator/sample counter 43 counts this one level signal indicating that one miscorrelation has occurred.

Upon the occurrence of the next clock pulse, the signals in sample register 13 are shifted to the succeeding stage with the signal in stage 92 being coupled back to the first stage through control gate 11. Again, the signal in the last stage is compared with the signal in stage six of reference register 40. If there is a correlation, indicating a miscorrelation between the sample and the binary information bit, a zero is developed which is coupled to correlator/counter 24. Correlator/counter 24 develops a one level signal in response to the zero and couples this to word correlator/sample counter 43. This sampling after each clock pulse will continue for the entire 92 clock pulses between the ST pulses. Every fourth clock pulse, a C/4 reference clock pulse will be coupled from terminal 106 of decoder timing generator 12 to reference register 40. This will cause the binary information in reference register 40 to shift one stage. For example, the first binary information bit located in stage six will be shifted to stage seven and the second binary information in stage five will be shifted to stage six, upon the occurrence of the first C/4 pulse or reference clock pulse after an ST pulse. This will allow the second bit in the first binary word of the address to be compared to the four sampled binary signals which should represent the second binary bit received at input terminal 10. By this process, all 92 samples in sample register 13 are compared with the information and parity bits for the first word in reference register 40. Four binary samples are compared with each of the information and parity bits.

If, during the 92 comparisons prior to the following ST pulse, 13 miscorrelations between the samples and the information bits are detected, an error signal is generated by word correlator/sample counter 43. When the next ST pulse is generated and the CR pulse following the ST pulse, this error signal will inhibit a control signal from being coupled to word flip-flop 37. If less than 13 errors or miscorrelations are detected, indicating that the correct first word has been detected, upon receipt of the CR pulse, by word correlator/sample counter 43 from terminal 126 of generator 12, a control signal will be coupled to word flip-flop 37 causing flip-flop 37 to change states and develop a one level word control signal. The CR′ pulse occurring immediately after the CR pulse which was responsible for the change of state of the word flip-flop 37, is then coupled from terminal 130 of decoder timing generator 12 to word correlator/sample counter 43 and will act to reset the counter therein and terminate any output signal to word flip-flop 37. The CR′ pulse acts to reset counter 43 after each 92 count cycle. Word flip-flop 37 has, however, changed states and will maintain this changed state.

When word flip-flop 37 changes state, it will couple an inhibit signal to one input of AND gate 49. This inhibit signal acts to prevent control signals developed by word correlator/sample counter 43, indicative of recognition of the inverted form of the first word in the address from being coupled through AND gate 49 to first inverted word flip-flop 52.

Word correlator/sample counter 43 is also capable of recognizing the inverse or complement of the binary word in reference register 40. If word correlator/sample counter 43 counts more than eighty miscorrections, between the samples and the information bits during a 92 count cycle, this indicates that the samples stored in sample register 13 are the same as the complement of the word in reference register 40. If a miscorrelation of greater than eighty is counted, a control signal is coupled from word correlator/sample counter 43 to one input of AND gate 49. If an inhibit signal is not coupled from word flip-flop 37 to AND gate 49, it will develop a one level signal at its output and couple this to inverted word flip-flop 52. Inverted word flip-flop 52 will change states in response to this control signal. When flip-flop 52 changes state, it couples a control signal to the second input of word flip-flop 37. Word flip-flop 37 reacts in the same way as if a control signal indicative of less than 13 errors have been coupled from word correlator/sample counter 43, and changes states as described earlier. With flip-flop 37 in a changed state, an inhibit signal is coupled to the second input of gate 49 thereby preventing a subsequent recognition of the first word complement.

The one level word control signal developed by word flip-flop 37 in this changed state is also coupled to code plug 36. Code plug 36 is responsive to the one level signal coupled from word flip-flop 37 to develop the second binary word in the address and terminate development of the first binary word in the address. At the appropriate time, the second word will be entered into reference register 40, in the same manner as the first binary word, and compared to the binary signals in sample register 13. The one level signal of word flip-flop 37 is also coupled to correlator/counter selector 24 and window counter enable flip-flop 41. Correlator/counter selector 24 is responsive to the one level word control signal to inhibit coupling any more one level miscorrelations or error signals to the counter in word correlator/sample counter 43 from EX-OR gate 15, and to couple CR′ pulses from decoder timing generator 12 to the counter input of word correlator/sample counter 43. Correlator/counter selector 24 in response to the one level word control signal also acts to inhibit CR′ pulses from being coupled to the reset inputs of the counter in word correlator/counter 43 so that the counter will not be reset by each CR′ pulse and will count each CR′ pulse. The one level word control signal of word flip-flop 37 coupled to window counter enable flip-flop 41, and to window flip-flop 54, sets window counter enable flip-flop 41 and window flip-flop 54 in anticipation of subsequent operation.

Each subsequent CR′ pulse developed by decoder timing generator 12 is coupled to correlator/counter selector 24, then to word correlator/sample counter 43. These CR′ pulses are counted in counter 43. When 89 CR′ pulses have been counted, counter 43 will develop an 89 count signal. This 89 count signal is also coupled to window counter enable flip-flop 41 causing it to change states and develop a zero level signal at the output. With the output of flip-flop 41 at a one level, window counter 53, which has been receiving CR′ pulses directly from decoder timing generator 12 is inhibited from counting the CR′ pulses. When the output of window counter enable flip-flop 41 changes to a zero state, window counter 53 is no longer inhibited and will begin to count subsequent CR′ pulses. The changed state of flip-flop 41 will also be coupled back to correlator/-counter selector 24 causing selector 24 to change its operation and couple errors or miscorrelations from EX-OR gate 15 to counter 43, and inhibiting the coupling of CR′ pulses through selector 24 to counter 43 to be counted. In addition, selector 24 will no longer inhibit CR′ pulses from being coupled to counter 43 for resetting the counter. The next occurring CR′ pulse will then cause a reset of the counter in counter 43.

At this 89th CR′ pulse, 22 binary bits of the second binary word in the address have been received, if there are no delays between the transmission of the first and second binary words. Between each ST pulse the binary samples stored in sample register 13 will be compared with the binary bits in reference register 40 by exclusive OR gate 15 as previously explained. Any miscorrelations therebetween will be coupled through correlator/counter selector 24 to word correlator/counter 43. Counter 43 will count every error or miscorrelation. When a 92 count has been reached by window counter 53, four samples, for each one of the 23 bits in the second binary word of the address should be stored in sample register 13. This, of course, is assuming that there are no delays between transmission of the first binary word and second binary word in the address. To further clarify, the first sample of the first bit in the second binary word of the address should be located in stage 92 of sample register 13. The fourth sample of the 23rd bit of the second binary word in the second binary word in the address should be stored in the first stage of sample register 13. If the binary signals in sample register 13 correspond to the correct binary word there will be full correlation with the binary bits in reference register 40. Furthermore, by waiting until the 92nd count subsequent to recognition of the first binary word, based upon the assumption that at this time the second word should be present in the sample register, it is not necessary to select a second word which is a subset of a cyclic mode as was done for the first word. This substantially enlarges the number of binary words which may be selected as the second binary word in the address, and substantially increases the number of combinations available and therefore, the number of different addresses available for transmission.

When the 92nd CR′ pulse has been received, window counter 53 will develop a 92 count signal which is coupled to window flip-flop 54. Window flip-flop 54 will change states and couples a one level signal to the input of each of output gates 45, 46, 47 and 48. If counter 43 counts less than 13 miscorrections in any count sequence between the 92nd CR′ count and the 95th CR′ count, an output control signal will be coupled from counter 43 to a second input of gates 45 and 47. If the first word detected was not the complement word, gate 45 will develop a detect signal at output terminal 56. If the first word detected was a complement of the binary word stored in reference register 40, gate 47 will change state and develop a detection signal at output terminal 58.

If word correlator/sample counter 43 counts more than eighty miscorrelations in any count between the 92nd and 95th CR′ count, this indicates that the second word is the complement of the word stored in reference register 40. The control signal developed in response to this greater than eighty count by counter 43, is coupled to inputs of gates 46 and 48. If the first word detected by the detector was identical to the first word in reference register 40, gate 46 will change states and develop a detection signal at output terminal 57. If the first word in the address was the complement of the word in reference register 40, gate 48 will change states and develop a detection signal at output terminal 59.

If a word has not been detected by the 95th CR′ pulse, window counter 53 will develop a 95th count signal which will reset window flip-flop 54 thus terminating one input signal to gates 45 to 48. In addition, the 95th count of window counter 53 will be coupled to word flip-flop 37 and inverter word flip-flop 52 resetting flip-flops 37 and 52 for receipt and recognition of the first word. The reset of flip-flops 37 and 52 will cause the reset of flip-flop 41 also and resetting the sequence detector for detection of another binary sequence.

As can be seen, an asynchronous digital sequence detector has been provided which requires no system, preamble, or frame synchronization to detect the digital words in an address. The detector is capable of detecting a large number of digital word sequential combinations. The digital words are detected asynchronously and the first word establishes a window during which the second word may be detected. In addition to providing an asynchronous digital sequence detector, an asynchronous digital signal correlator for such a detector has also been provided which needs no bit or frame synchronization and will immediately correlate the presence of signal upon receipt of the same.

We claim:

1. A detector for detecting first and second predetermined digital words within a train of signals wherein the digits in said words each have a predetermined time period, said detector including in combination; clock means for developing a plurality of first clock pulses during the interval of one of said digit time periods, sample and storage means for receiving said train of signals, said sample and storage means being coupled to said clock means and responsive to each of said first clock pulses to sample the signals in said train of signals coupled thereto and store a digital signal corresponding to said sampled signal, memory means for storing digital words corresponding to said predetermined digital words, and comparison means coupled to said sample and storage means and said memory means and operative between said first clock pulses to compare said digital signals in said sample and storage means with a first digital word in said memory means, said comparison means being operative in response to a correlation between said digital signals in said sample and storage means and said first digital word to count a first time period at least as long as the time period of the second digital word and develop a first timing signal, said comparison means being further operative in response to said first timing signal to compare the digital signals in said sample and storage means with the second digital word in said memory means and develop a detection signal in response to a correlation therebetween.

2. The detector of claim 1 wherein said predetermined digital words each include a plurality of said digits, and said sample and storage means includes a plurality of storage stages equal to the number of said digits in one of said words multiplied by the plurality of first clock pulses developed during the interval of one of said digit time periods.

3. The detector of claim 2 wherein said comparison means includes first gating circuit means coupled to said sample and storage means and said memory means and operative to compare said digital signals in said sample and storage means with said first digital words in said memory means and develop comparison signals in response to a comparison therebetween, counter means coupled to said first gating circuit means for counting said comparison signals, said counter means developing counting signals in response to said comparison signals indicative of a predetermined number of miscorrelations, circuit means operative in response to particular counting signals to switch from a first mode select signal to a second mode select signal, said counter means operative in response to said second mode select signal to inhibit counting said comparison signals, to count for at least said first time period and develop said first timing signal, said memory means being operative in response to said second mode select signal to couple said second digital word to said comparison means, said circuit means being operative in response to said first timing signal to develop a reset mode select signal, said counter means operative in response to said reset mode select signal to count said comparison signals coupled thereto and develop counting signals indicative of a predetermined number of miscorrelations between said second digital word and said digital signals in aid sample and storage means, said circuit means operative in response to said particular counting signals to develop said detection signal.

4. The detector of claim 3 wherein said circuit means further includes, timing means coupled to said counter means and operative in response to said first timing signal to develop a second timing signal of a predetermined period, and second gating circuit means coupled to said counter means and timing means and being operative in response to said second timing signal and said counting signals indicative of said predetermined number of miscorrelations between said second digital word and said digital signals to develop said detection signal.

5. The detector of claim 4 wherein said digital signals are binary signals, said digits are bits, snd said digital words are binary words.

6. The detector of claim 5 wherein said clock means includes means for developing third clock pulses, divider means coupled to said means for developing said third clock pulses, said divider means being operative to divide said third clock pulses by a first particular number to develop said second clock pulses, said divider means being operative to divide by a second particular number larger than said first particular number and develop first clock pulses.

7. The detector of claim 6 wherein said sample and storage means includes first shift register means having said plurality of storage stages serially connected, gating means coupled to the first and last stages of said shift register means for coupling said last stage to said first stage to form a closed loop, said gating means further having an input for receiving said train of signals, said gating means operative in response to said first clock pulses to open said loop from said last stage to said first stage, sample the bit in the train of signals serially coupled thereto, develop said binary signal corresponding to said sampled signal and couple same to said first shift register means first stage, said first shift register means being responsive to said first clock pulses to shift the contents of each stage in said shift register to the following stage and enter said sampled signal in said first stage, said clock means further coupling said third clock pulses to said shift register means, said shift register means being operative in response to said third clock pulses to shift said stored binary signals therethrough from output to input in one complete cycle.

8. The detector of claim 7 wherein said memory means includes storage register means for storing portions of each of said binary words corresponding to said predetermined binary words.

9. The detector of claim 7 wherein said memory means further includes, second shift register means, said storage register means being coupled to said second shift register means and said circuit means, and operative in response to said second mode select signal to couple one of said portions of a binary word to said second shift register means.

10. The detector of claim 9 wherein said predetermined binary words each include a predetermined number of information bits and a predetermined number of parity bits, said plurality of stages in said second shift register means being equal in number to said predetermined number of information bits, said second shift register means further including parity generation means coupled to said plurality of stages and operative in response to said information bits stored therein to develop said parity bits.

11. The detector of claim 10 wherein said second shift register means is coupled to said clock means and operative in responsive to said second clock pulses to shift said bits therethrough.

12. The detector of claim 11 wherein said clock means develops four first clock pulses during the interval of a bit time period and said clock means develops each of said second clock pulses on every fourth clock pulse.

13. The detector of claim 12 wherein said clock means further includes control circuit means operative to develop a first control pulse a predetermined period after each of said plurality of first clock pulses, and wherein said first gating circuit means is coupled to one of said stages of said first shift register means and one of said stages of said second shift register means, said counter means including fourth gating circuit means coupled to said first gating circuit means and counter register means coupled to said fourth gating circuit means, said fourth gating circuit means being operative in response to said first mode select signal to couple said comparison signals to said counter register means, said fourth gating circuit means being operative in response to said second mode select signal to inhibit coupling of said comparison signals to said counter register means and couple said first control pulses to said counter register means, said counter register means being operative to count a predetermined number of said first control pulses and develop said first timing signal, said fourth gating circuit means being operative in response to said reset mode select signal to inhibit coupling of said first control pulses to said counter register and couple said comparison signals thereto.

14. The detector of claim 13 wherein said fourth gating circuit means is further operative to couple said first control pulses to said counter register means when said fourth gating circuit means couples said comparison signals thereto, said counter-register means operative in response to said first control pulses to reset said counting signals indicative of a predetermined number of miscorrelations to a zero count.

15. The detector of claim 14 wherein said circuit means further includes first bistable means coupled to said counter register means and said fourth gating circuit means and operative in response to said comparison signals indicative of a predetermined number of miscorrelations to switch states terminating said first mode select signal and developing said second mode select signal, second bistable means coupled to said first bistable means, said counter register means and said fourth gating circuit means and operative in response to said second mode select signal and said first timing signal to develop said reset mode select signal, said timing means being coupled to said second bistable means to said clock means and operative in response to said reset mode select signal to develop said second timing signal, said timing means being operative in response to receipt of a predetermined number of said first control pulses to terminate said second timing signal.

16. The detector of claim 15 wherein said first bistable means includes means for developing an inverse second mode select signal in response to comparison signals indicative of a predetermined number of miscorrelations, said second gating circuit means being coupled to said first bistable means and operative in response to the presence of said comparison signals indicative of a predetermined number of miscorrelations, said inverse second mode select signal and said second timing signal to develop said detection signal.

17. The detector of claim 16 further including signal correlation means coupled to said sample and storage means and clock means, said signal correlation means being operative to compare the binary signals within each of a plurality of successive groups of said binary signals stored in a plurality of said stages of said sample and storage means and develop a second counting signal in response to a miscorrelation within each of said successive groups, and second circuit means coupled to said signal correlation means and operative in response to a predetermined number of said counting signals to inhibit coupling of said third clock signals from said clock means whereby said detector operation is terminated.

18. The detector of claim 17 wherein each of said successive groups of said binary signals includes a predetermined number of binary signals, said plurality of first clock pulses developed during the interval of one of said bit periods divided by the number of binary signals in one of said successive groups of said binary signals being an integer of at least two.

19. The detector of claim 18 wherein said signal correlation means includes fifth gating circuit means coupled to said sample and storage means and operative to compare the binary signals within said group of said binary signals in said stages and develop comparison signals in response to said miscorrelations, and second counter means coupled to said fifth gating means for counting said comparison signals, said second counter means developing said second counting signals in response thereto.

20. In a detector for detecting predetermined digital words within a train of signals wherein the digits in said words each have a predetermined time period and the detector samples each digit a plurality of times, circuitry for inhibiting the operation of said detector during the presence of noise, or the like, in the train of signals including in combination; timing means for developing a start signal at predetermined intervals, clock means being operative to develop a plurality of first clock pulses during the interval of a digit time period, circuit means coupled to said timing means and clock means and operative in response to said start signals to couple said first clock pulses from said clock means, sample and storage means, having a plurality of storage stages, coupled to receive said train of signals and further coupled to said circuit means for receiving said first clock pulses and responsive to each of said first clock pulses to sample the signals in the train of signals coupled thereto and store a digital signal corresponding to said sampled signal, signal correlation means coupled to said sample and storage means, said circuit means and said clock means, said signal correlation means being operative to compare to each other the digital signals within a predetermined group of said digital signals in said stages and develop counting signals in response to a predetermined number of comparisons of successive groups in said stages indicative of a predetermined number of miscorrelations, said circuit means being operative in response to a predetermined number of said counting signals to inhibit development of said first clock pulses whereby said detector operation is terminated.

21. In the detector of claim 20 wherein said plurality of first clock pulses developed during the interval of said digit time period divided by the number of digital signals within said group of said digital signals is an integer.

22. In the detector of claim 21 wherein each of said successive groups of said digital signals includes a predetermined number of digital signals, said plurality of first clock pulses during the interval of said digit time period divided by the number of digital signals in one of said successive groups of said digital signals being an integer of at least two.

23. In the detector of claim 22 wherein said signal correlation means includes first gating circuit means coupled to said sample and storage means and operative to compare the digital signals within said group of digital signals in said stages and develop comparison signals in response to the comparison therebetween, and counter means coupled to said first gating means for counting said comparison signals, said counter means developing said counting signals.

24. In the detector of claim 23 wherein said particular digital words each have a predetermined number of digits, said sample and storage means have a number of stages equal to said predetermined number of digits in one said words multiplied by said plurality of first clock pulses developed during the interval of said digit time period.

25. In the detector of claim 24 wherein said circuit means includes second gating circuit means coupled to said timing means and said clock means, said second gating circuit means operative in response to said start signal to allow said clock means to develop said first clock signals, and third gating circuit means coupled to said timing means and said counter means, said third gating circuit means being operative in response to said counting signals indicative of a predetermined number of miscorrelations to develop error signals, said second gating circuit means being coupled to said third gating circuit means and operative in response to said error signals coupled therefrom to inhibit development of said first clock pulses whereby said detector operation is terminated.

26. In the detector of claim 25 wherein said third gating circuit means includes bistable means coupled to said timing means and said second gating circuit means, said bistable means being operative in response to termination of said start signal and a timing signal from said second gating circuit means to change the number of miscorrelations necessary to develop said error signal.

27. In the detector of claim 26 further including memory means for storing digital words corresponding to said predetermined digital words, comparison means coupled to said sample and storage means and said memory means and operative to compare said digital signals in said sample and storage means with a first digital word in said memory means, said comparison means being operative in response to a correlation between said digital signals and said first digital word to count a first period at least as long as the time period of said digital word and develop a first timing signal, said comparison means being further operative in response to said first timing signals to compare said digital signals in said sample and storage means with a second digital word in said memory means and develop a detection signal in response to a correlation therebetween.

28. In the detector of claim 27 wherein said first gating circuit means is coupled to a plurality of stages of said sample and storage means equal to the number of digital signals within said group of digital signals in said stages, said clock means being operative to develop a plurality of third clock pulses between said first clock pulses, and said counter circuit means count said comparison signals on particular ones of said third clock pulses.

29. In the detector of claim 28 wherein said plurality of first clock pulses during the interval of a digit period includes four clock pulses, said group of digital signals includes two digital signals, said first gating circuit means is coupled to the last and next to last stage of said sample and storage means and said counting means counts on every other third clock pulse.

30. In the detector of claim 29 wherein said second gating means is operative in response to two error signals in succession to inhibit coupling of said first clock signals from said first clock means.

31. A detector for detecting predetermined binary words within a train of signals wherein each bit in said word has a predetermined time period, said detector including in combination; first timing means for developing a start signal having a first predetermined time period at predetermined intervals, clock means being operative to develop first clock pulses and third clock pulses, a plurality of said first clock pulses being developed during the interval of a bit time period, first circuit means coupled to said timing means and clock means for receiving said third clock pulses and operative in response to said start signals to couple said third clock pulses therefrom, sample and storage means, having a plurality of stages, coupled to said clock means and responsive to each of said first clock signals to sample the signals in the train of signals coupled thereto and store a binary signal corresponding to said sampled signal, signal correlation means coupled to said sample and storage means and clock means, said signal correlation means being operative in response to particular ones of said third clock pulses to compare to each other the binary signals within a group of said binary signals in said stages and develop first counting signals in response to a predetermined number of comparisons of successive groups in said stages indicative of a predetermined number of miscorrelations, said first circuit means being coupled to said signal correlation means and operative in response to a predetermined number of said counting signals to inhibit coupling of said third clock signals from said clock means whereby said detector operation is terminated, memory means for storing binary words corresponding to said predetermined binary words, comparison means coupled to said sample and storage means and said memory means and operative between said first clock pulses to compare said binary signals in said sample and storage means with a first binary word in said memory means, said comparison means being operative in response to a correlation between said binary signals in said sample and storage means and said first binary word to count a first time period at least as long as the time period of said binary word and develop a first timing signal, said comparison means being further operative in response to said first timing signal to compare the binary signals in said sample and storage means with a second binary word in said memory means and develop a detection signal in response to a correlation therebetween.

32. The detector of claim 31 wherein said predetermined binary words each include a plurality of binary bits and said sample and storage means includes a plurality of storage stages equal to the number of binary bits in one of said words multiplied by the plurality of first clock pulses developed during the interval of a bit time period.

33. The detector of claim 32 wherein each of said successive groups of said binary signals includes a predetermined number of binary signals, said plurality of first clock pulses during the interval of a bit time period divided by the number of binary signals in one of said successive groups of said binary signals being an integer of at least two.

34. The detector of claim 33 wherein said sample and storage means includes first shift register means having said plurality of stages serially connected, said signal correlation means including first gating circuit means coupled to a plurality of said stages of said sample and storage means and operative to compare the binary signals in said stages and develop comparison signals in response to the comparison therebetween, and first counter means coupled to said first gating circuit means for counting said comparison signals, said first counter means developing said first counting signals.

35. The detector of claim 34 wherein said comparison means includes second gating circuit means coupled to said sample and storage means and said memory means and operative to compare said binary signals in said sample and storage means with said first binary word in said memory means and develop comparison signals in response to a comparison therebetween, second counter means coupled to said second gating means for counting said comparison signals, said second counter means developing second counting signals in response to said comparison signals indicative of a predetermined number of miscorrelations, second circuit means operative in response to particular second counting signals to switch from a first mode select signal to a second mode select signal, said second counter means operative in response to said second mode select signal to inhibit counting of said comparison signals, to count for at least said first time period and develop said first timing signal, said memory means being operative in response to said second mode select signal to couple said second binary word to said comparison means, said second circuit means being operative in response to said first timing signal to develop a reset mode select signal, said second counter means operative in response to said reset mode select signal to count said comparison signals coupled thereto and develop counting signals indicative of a predetermined number of miscorrelations between said second binary word and said binary signals in said sample and storage means, said second circuit means operative in response to said particular counting signals to develop said detection signal.

36. The detector of claim 35 wherein said second circuit means further includes, timing means coupled to said second counter means and operative in response to said first timing signal to develop a second timing signal of predetermined period, and third gating circuit means coupled to said second counter means and timing means and being operative in response to said second timing signal and said second counting signals indicative of said predetermined number of said miscorrelations between said second binary word and binary signals to develop said detection signal.

37. The detector of claim 36 wherein said memory means includes, second shift register means and storage register means coupled to said second shift register means and said second circuit means, said storage register means storing portions of each of said binary words corresponding to said predetermined binary words, said storage register means being operative in response to said second mode select signal to couple one of said portions of a binary word to said second shift register means.

38. In a detector for detecting particular binary word sequences within a received train of signals wherein said words in said sequence each include a predetermined number of bits, each bit having a predetermined time period, the method including the steps of:

a. continuously sampling said received train of signals, a plurality of said sampling being taken within said time period of a bit,
b. developing a binary signal corresponding to the sampled signal in said train of signals in response to each sampling,
c. comparing a particular number of said binary signals to a stored binary word corresponding to the first word in said sequence,
d. counting a first time period at least as long as the time period of a digital word in said sequence after a correlation between a predetermined number of particular binary signals and the bits of said stored binary word,
e. comparing a second particular number of said binary signals to said second stored binary words corresponding to the second word in said sequence after termination of said first time period, and
f. developing a detection signal in response to a predetermined number of correlations between said second particular number of said binary signals and the bits of said second stored binary word in said sequence.

39. The method of claim 38 wherein said particular number of binary signals compared to said stored binary words is equal to the predetermined number of bits in each of said words multiplied by the plurality of said samplings being taken within said time period of a bit.

40. The method of claim 39 wherein said plurality of said samplings being taken within the time period of said bit is four.

41. The method of claim 40 wherein said comparing of said binary signals to said stored binary words occurs between each of said samplings.

42. The method of claim 41 wherein four of said binary signals in said particular number of said binary signals are compared to one bit in said stored binary word.

43. The method of claim 42 wherein said train of signals is serially received and wherein said binary signals are stored in series.

44. In a detector for detecting the presence of a train of digital signals wherein the digits each have a predetermined time period, a method of inhibiting the operation of said detector in the presence of noise and the like, said method including the steps of:

a. continuously sampling said train of signals, a plurality of said samplings being taken within said time period of a digit,
b. developing a digital signal corresponding to the sampled signal in said train of signals in response to each sampling,
c. comparing a group of said digital signals occurring in sequence to one another and developing a comparison signal in response to a miscorrelation therebetween,
d. counting said comparison signals developed in response to a number of comparisons in successive groups, and
e. terminating the detecting operation in response to a predetermined number of said comparison signals being developed in a predetermined time period.

45. The method of claim 44 wherein said plurality of said samplings being taken within the time period of a digit divided by the number of digital signals within said group of digital signals in an integer.

46. The method of claim 45 wherein said integer is at least two.

47. The method of claim 46 wherein said plurality of said samplings being taken within the time period of said digit is four and the digital signals within a group is two.

* * * * *